United States Patent
Numazawa (10) Patent No.: US 10,598,411 B2
(45) Date of Patent: Mar. 24, 2020

(54) MAGNETIC REFRIGERATING DEVICE

(71) Applicant: National Institute for Materials Science, Ibaraki (JP)

(72) Inventor: Takenori Numazawa, Tsukuba (JP)

(73) Assignee: National Institute for Materials Science, Ibaraki (JP)

( * ) Notice: Subject to any disclaimer, the term of this patent is extended or adjusted under 35 U.S.C. 154(b) by 497 days.

(21) Appl. No.: 15/320,105

(22) PCT Filed: Jun. 24, 2015

(86) PCT No.: PCT/JP2015/068223
§ 371 (c)(1),
(2) Date: Dec. 19, 2016

(87) PCT Pub. No.: WO2015/199139
PCT Pub. Date: Dec. 30, 2015

(65) Prior Publication Data
US 2017/0130999 A1    May 11, 2017

(30) Foreign Application Priority Data

Jun. 26, 2014    (JP) ................. 2014-131905

(51) Int. Cl.
*F25B 21/00*    (2006.01)

(52) U.S. Cl.
CPC ........ *F25B 21/00* (2013.01); *F25B 2321/002* (2013.01); *F25B 2321/0022* (2013.01); *Y02B 30/66* (2013.01)

(58) Field of Classification Search
CPC ........ F25B 2321/002; F25B 2321/0022; F25B 21/00
See application file for complete search history.

(56) References Cited

U.S. PATENT DOCUMENTS 4,727,721 A    3/1988 Peschka et al.
4,735,053 A *  4/1988 Carpetis ............. F25B 21/00
                                                        60/520

(Continued)

FOREIGN PATENT DOCUMENTS

JP    62-106271 A    5/1987
JP    62-153662 A    7/1987

(Continued)

OTHER PUBLICATIONS

JP2005090921A English Translation (Year: 2003).*

(Continued)

*Primary Examiner* — Marc E Norman
*Assistant Examiner* — Schyler S Sanks
(74) *Attorney, Agent, or Firm* — Morgan, Lewis & Bockius LLP (57) ABSTRACT

Magnetic refrigerating device improves refrigerating capacity and efficiency by improving the heat exchanging method between a magnetic material and a heat exchanging fluid and devising a magnetic field applying method. The magnetic refrigerating device comprises: a cylindrical active magnetic regenerator (AMR) bed accommodating refrigerant therein; two magnetic materials disposed in the AMR bed in the axial direction, configured to be movable in the axial direction of the AMR bed, and made of material having a magnetocaloric effect; at least two permanent magnets positioned to face the two magnetic materials; a rotary shaft positioned between the two magnetic materials in the AMR bed and positioned between the at least two permanent magnets; and a magnetic rotary movement unit that rotationally moves the permanent magnets about the rotary shaft and that repeatedly moves the permanent magnets and the two magnetic materials closer together and farther apart in association with the rotational movement.

12 Claims, 7 Drawing Sheets

(56) References Cited

U.S. PATENT DOCUMENTS

| | | | |
|---|---|---|---|
| 5,743,095 | A | 4/1998 | Gschneidner, Jr. et al. |
| 6,502,404 | B1 | 1/2003 | Arman et al. |
| 2007/0125095 | A1 | 6/2007 | Iwasaki et al. |
| 2009/0113897 | A1 | 5/2009 | Dinesen et al. |
| 2011/0215088 | A1 | 9/2011 | Muller et al. |
| 2012/0031108 | A1* | 2/2012 | Kobayashi .............. F25B 21/00 62/3.1 |
| 2015/0184903 | A1* | 7/2015 | Mun .................. F25B 21/00 62/3.1 |

FOREIGN PATENT DOCUMENTS

| | | | |
|---|---|---|---|
| JP | 2005-090921 | A | 4/2005 |
| JP | 2005090921 | A * | 4/2005 |
| JP | 2007-147136 | A | 6/2007 |
| JP | 2008-249175 | A | 10/2008 |
| JP | 2010-151407 | A | 7/2010 |
| JP | 2012-037112 | A | 2/2012 |

OTHER PUBLICATIONS

"Eu niokeru F gasu kisei no doko to gyokai no taio ni tsuite", ("Movement and counteraction of the EU industry for F-gas control"), Feb. 1, 2013, Japan Association of Refrigeration and Air-Conditioning Contractors, Susumu Ishii, http://www.kikonet.org/event/doc/130201-4.pdf (in Japanese and English) (Cited in specification).

"Oubei deno kaheakon reibai kisei doukou to kokunai kaisei furon hou heno taioukentou", ("Movement of car air conditioner refrigerant control in Europe and America and discussion of action to the revised CFC control law in Japan"), Apr. 24, 2014, Japan Automobile Manufacturers Association, Inc., car air conditioner refrigerant WG, http://www.meti.go.jp/committee/sankoushin/seizou/kagaku/freon_wg2/pdf/004_02_01.pdf (in Japanese) (Cited in specification).

International Search Report dated Sep. 8, 2015, for corresponding International Patent Application No. PCT/JP2015/068223.

Extended European Search Report dated Sep. 4, 2018, issued in corresponding European Patent Application No. 15811681.4.

* cited by examiner

MAGNETIC REFRIGERATING DEVICE

TECHNICAL FIELD

The present invention relates to magnetic refrigerating devices suitable for use in air conditioners, car air conditioners, refrigerators, and other devices for heating and cooling in buildings and air conditioning in rooms, particularly to magnetic refrigerating devices using a refrigerant permitted for use in refrigerant substitutes for chlorofluorocarbon and fluorine-based greenhouse effect gases which are effective for protection of the ozone layer of the earth's atmosphere.

BACKGROUND ART

In Japan, heating and cooling systems currently use refrigerants which are substitutes for chlorofluorocarbon, such as HFC-134a ($CH_2F$—$CF_3$), in order to stop serious destruction of the ozone layer due to chlorofluorocarbon. However, since these substitutes for chlorofluorocarbon give greenhouse effect 1300 times greater than that by $CO_2$, which is defined as a greenhouse effect gas, the leakage of the currently used refrigerants to the global environment have a profound effect thereon. Hence, in EU, where hydrofluorocarbon (HFC), perfluorocarbon (PFC), and sulfur hexafluoride ($SF_6$) in the Kyoto Protocol are called "F gases", the EU car air conditioner refrigerant directive has already banned HFC-134a for use in new-model cars. Likewise, North America is considering future prohibition of this substance (see Non Patent Literatures 1 and 2).

Meanwhile, magnetic refrigeration systems which do not use substitutes for chlorofluorocarbon have attracted attention as heating and cooling systems. Magnetic refrigeration systems, which do not use substitutes for chlorofluorocarbon, are expected to contribute to protection of the ozone layer of the earth's atmosphere and restrain global warming due to greenhouse effect gases.

In a magnetic refrigeration system here, a magnetocaloric effect given by a magnetic material is effectively propagated by a heat exchanging fluid to drive a predetermined refrigeration cycle, thereby providing a range of refrigerant temperature and refrigerating capacity. This is typically called an active magnetic regenerator (AMR) refrigeration method and is widely recognized as an essential method at high temperatures, particularly for magnetic refrigeration at room temperature (see Patent Literatures 1 to 3).

Figure 1:
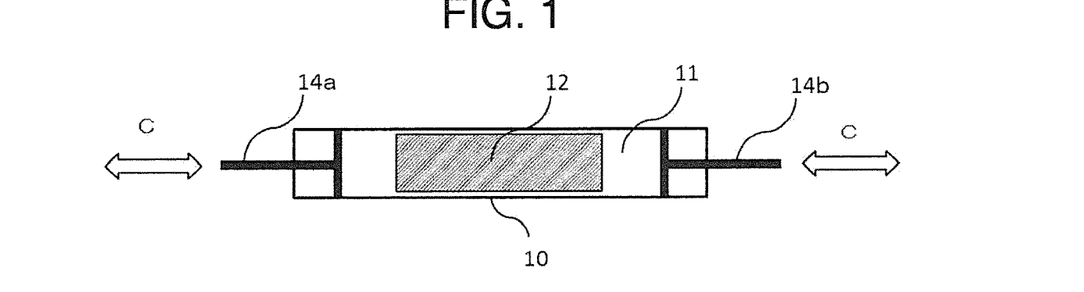
FIG. 1 is a structural diagram of a known reciprocating AMR.

As shown in FIG. 1, a known AMR includes a bed 10 which is, for example, a cylinder filled with a granulated magnetic material 12 and a refrigerant 11 acting as a heat exchanging fluid (water or ethylene glycol) introduced thereinto (the bed is hereinafter referred to as "AMR bed"). Pistons 14a and 14b are provided at both ends of the AMR bed 10 in order to drive the refrigerant 11. These two pistons 14a and 14b move in the direction of the arrow C to make a flow of the refrigerant 11 in the magnetic material 12. One end of the AMR bed 10 is at a low temperature, and the other is at a high temperature.

Figure 2:
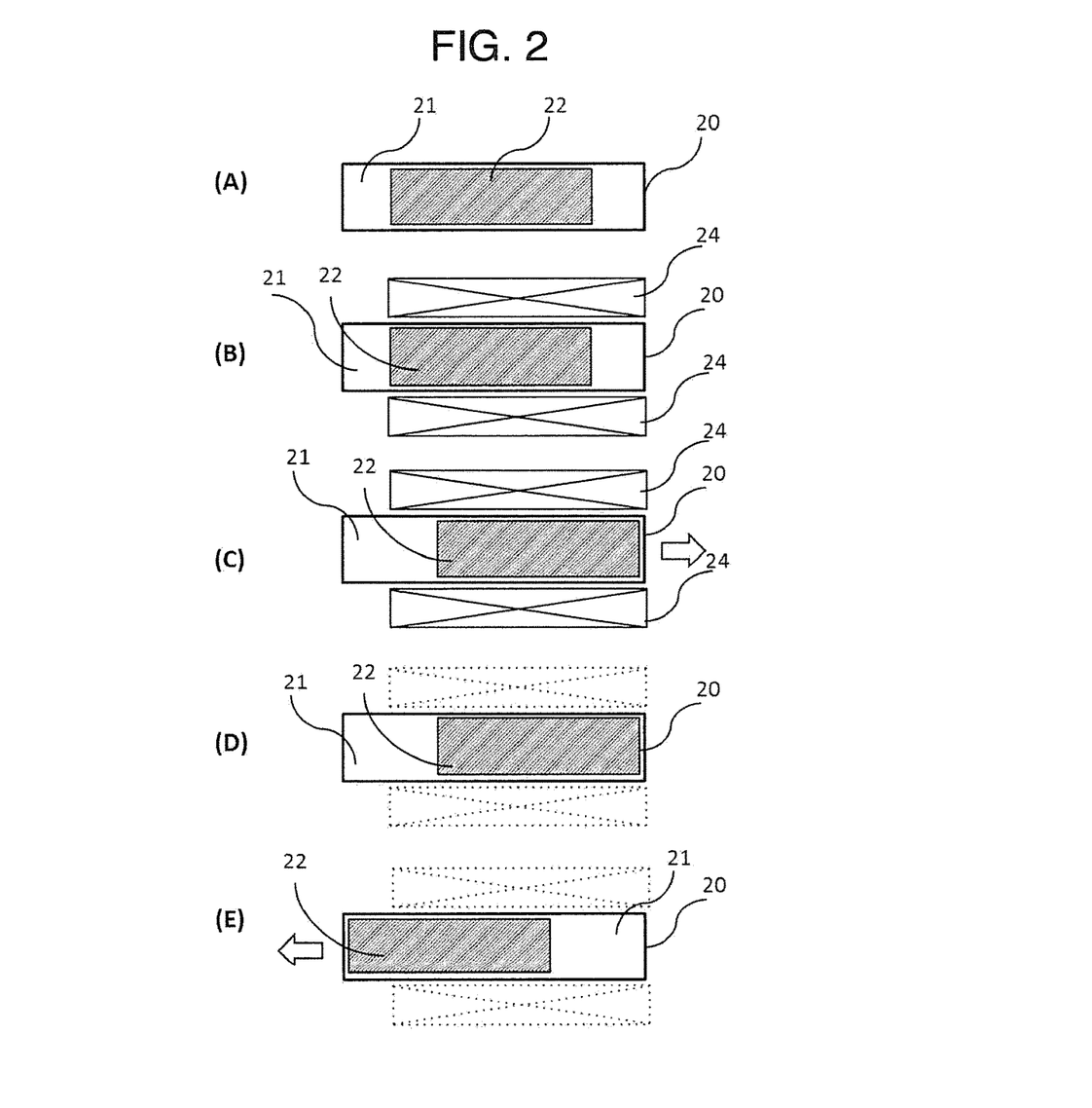
FIG. 2 is a diagram for explaining the operation of an AMR having the structure shown in FIG. 1.

As shown in FIG. 2, in a typical AMR, a permanent magnet 24, for example, gives a magnetic field to a magnetic material 22 held in an AMR bed 20, and pistons (not shown in the drawing) at both ends of the bed, for example, generate a flow of the heat exchanging fluid.

To be specific, in the initial state, the magnetic material 22 is positioned in the middle of the AMR bed 20 (FIG. 2, (A)). The temperature in the magnetic material 22 is uniform. In the next state, magnetic field generating devices 24 outside the AMR bed 10 apply a magnetic field to the magnetic material 22 in the AMR bed 20 (FIG. 2, (B)). The temperature in the magnetic material 22 is uniform but higher than in the initial state. In the next state, the magnetic material 22 moves in the AMR bed 20 in the direction of the arrow and reaches one end of the AMR bed 20 at a low temperature (FIG. 2(C)). Since heat exchange occurs between a refrigerant 21 and the magnetic material 22, a temperature gradient occurs in the magnetic material 22, so that, in the drawing, the right end is at the lowest temperature and the left end is at the highest temperature.

The magnetic field generating devices 24 are then demagnetized (FIG. 2, (D)). The temperature in the magnetic material 22 uniformly decreases while the temperature gradient generated in the step shown in FIG. 2, (C) is held. Subsequently, the magnetic material 22 moves in the AMR bed 20 in the opposite direction indicated by the arrow by the aid of the resilience given by a spring or the like and reaches the other end of the AMR bed 20 at a high temperature (FIG. 2, (E)). The movement of the magnetic material 22 generates heat exchange between the refrigerant 21 and the magnetic material 22, further increasing the temperature gradient. Repetition of the process from FIG. 2, (B) to FIG. 2, (E) generates such a temperature gradient in the AMR bed 20 that the right end is at the lowest temperature and the left end is at the highest temperature. Providing heat exchangers at both ends produces a refrigerating effect.

When the heat exchanging fluid is caused to flow in the magnetic material 22 in sync with the reciprocating motion of the magnetic material 22 along the axis and the refrigeration cycle is driven in the above-described manner, a temperature difference is generated between both ends of the AMR. A rotation AMR, in which an AMR bed is disposed on part of a circular plate and an AMR cycle is operated using a rotating magnetic material or magnetic field, is known to give an equivalent effect to that given by a reciprocation type.

Figure 3:
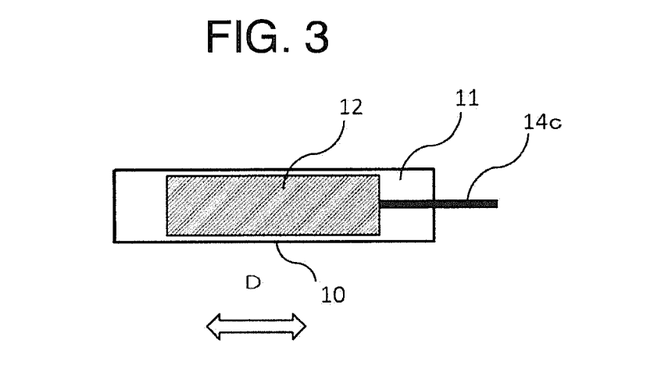
FIG. 3 is a structural diagram of another known typical AMR.

In another typical AMR shown in FIG. 3, the magnetic material 12 in the AMR bed 10 is driven by a piston 14c in the direction of the arrow D to cause the heat exchanging fluid 11 to flow in the magnetic material. This structure also gives an equivalent effect to that given by the device in FIG. 2.

However, the conventional AMR systems have the following problems:

(i) A mechanism for driving the magnetic material and the heat exchanging fluid is required, which requires high energy input;

(ii) A rotation AMR needs the switching of the high- and low-heat exchanging fluids, causing a heat loss due to the mixture of the fluids during the switching, and (iii) This complex driving mechanism hinders an increase in the frequency of the refrigeration cycle.

CITATION LIST

Patent Literature

PATENT LITERATURE 1: JP-A-2012-37112
PATENT LITERATURE 2: U.S. Pat. No. 5,743,095
PATENT LITERATURE 3: U.S. Pat. No. 6,502,404

Non Patent Literature

NON PATENT LITERATURE 1: EU niokeru F gasu kisei no doukou to gyokai no taio ni tsuite (Movement and counteraction of the EU industry for F-gas control), Feb.

1, 2013, Japan Association of Refrigeration and Air-Conditioning Contractors, Susumu Ishii, http://www.kikonet.org/event/doc/130201-4.pdf NON PATENT LITERATURE 2: Oubei deno kah-eakon reibai kisei doukou to kokunai kaisei furon hou eno taioukentou (Movement of car air conditioner refrigerant control in Europe and America and discussion of action to the revised CFC control law in Japan), Apr. 24, 2014, Japan Automobile Manufacturers Association, Inc., car air conditioner refrigerant WG, http://www.meti.go.jp/committee/sankoushin/seizou/kagaku/freon_wg2/pdf/004_02_01.pdf

SUMMARY OF INVENTION

Technical Problem

An object of the present invention is to provide a magnetic refrigerating device using an improved method for heat exchange between a magnetic material and a heat exchanging fluid and a devised method for magnetic field application, thereby increasing refrigerating capacity and refrigerating efficiency.

Solution to Problem

Figure 4:
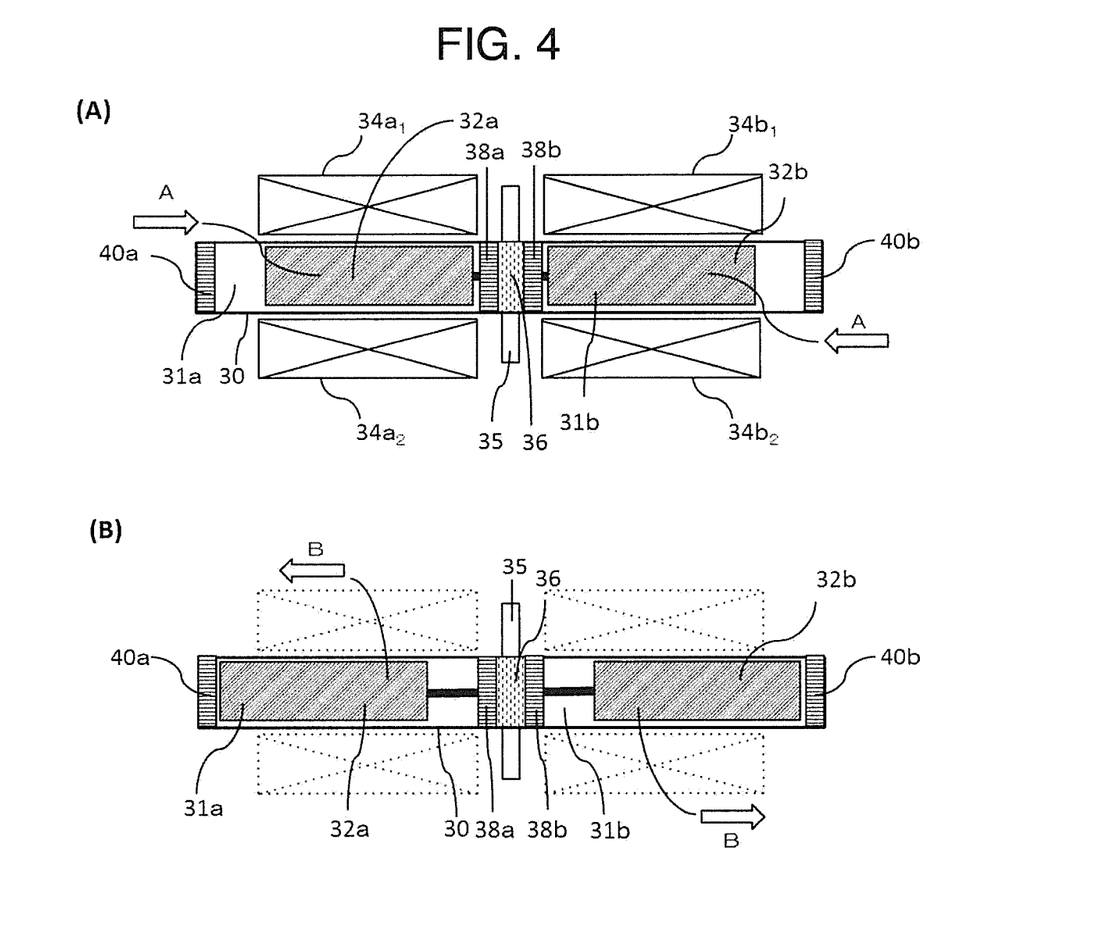
FIG. 4 shows the main structure of a horizontally opposed-type AMR according to a first embodiment of the invention.

As shown in FIG. 4, for example, a magnetic refrigerating device of the invention includes: a cylindrical AMR bed 30 that contains refrigerants 31a and 31b; two magnetic materials 32a and 32b arranged in a direction of an axis of the AMR bed 30, the magnetic materials being movable in the direction of the axis of the AMR bed 30 and made of magnetocaloric effect materials; at least two permanent magnets 34a1, 34a2, 34b1, and 34b2 facing the two magnetic materials in the AMR bed 30; a rotary shaft 35 between the two magnetic materials in the AMR bed 30 and between the at least two permanent magnets; and a rotator (not shown in the drawing) that rotates the permanent magnets or the AMR bed 30 about the rotary shaft 35 such that the permanent magnets and the two magnetic materials repeatedly get close to and away from each other due to the rotation, wherein heat exchange occurs between the magnetic materials and the refrigerants in the AMR bed 30 and generates a temperature difference in the AMR bed.

In a magnetic refrigerating device of the invention, it is preferable that the magnet rotator includes two magnet-mounting plates positioned above and below the AMR bed 30 so as to face each other, the two magnet-mounting plates each including at least two permanent magnets facing the two magnetic materials.

A magnetic refrigerating device of the invention preferably further includes a magnetic material reciprocating unit 36 that causes the two magnetic materials to reciprocate in the direction of the axis such that when one of the magnetic materials moves toward an outside in the direction of the axis of the AMR bed, the other magnetic material also moves toward the outside.

A magnetic refrigerating device of the invention preferably further includes high-temperature-side heat exchangers 40a and 40b at both ends of the AMR bed 30; and low-temperature-side heat exchangers 38a and 38b adjacent to the rotary shaft of the AMR bed 30.

In a magnetic refrigerating device of the invention, it is preferable that the AMR bed includes a plurality of AMR beds 30 arranged in the same layer having the rotary shaft 35 as a center, two magnet-mounting plates are included above and below the layer in which the plurality of AMR beds is arranged, the two magnet-mounting plates each including at least two permanent magnets facing the AMR beds 30, the number of the permanent magnets is two or more and is less than the doubled number of the arranged AMR beds 30.

A magnetic refrigerating device of the invention includes: a cylindrical AMR bed that contains refrigerants; two magnetic materials arranged in a direction of an axis of the AMR bed, the magnetic materials being movable in the direction of the axis of the AMR bed and made of magnetocaloric effect materials; a magnetic material reciprocating unit that causes the two magnetic materials to reciprocate in the direction of the axis such that when one of the magnetic materials moves toward an outside in the direction of the axis of the AMR bed, the other magnetic material also moves toward the outside; and a magnetic field applying-removing mechanism that applies and removes a magnetic field to generate a magnetic force and drives the magnetic materials by the generated magnetic force, wherein heat exchange occurs between the magnetic materials and the refrigerants in the AMR bed and generates a temperature difference in the AMR bed.

In a magnetic refrigerating device of the invention, it is preferable that the magnetic field applying-removing mechanism includes at least two permanent magnets facing the two magnetic materials in the AMR bed.

In a magnetic refrigerating device of the invention, it is preferable that the magnetic material reciprocating unit is an elastic material provided between the two magnetic materials.

In a magnetic refrigerating device of the invention, it is preferable that the magnetic material reciprocating unit is an actuator that is provided between the two magnetic materials and expands and contracts in the direction of the axis.

Figure 9:
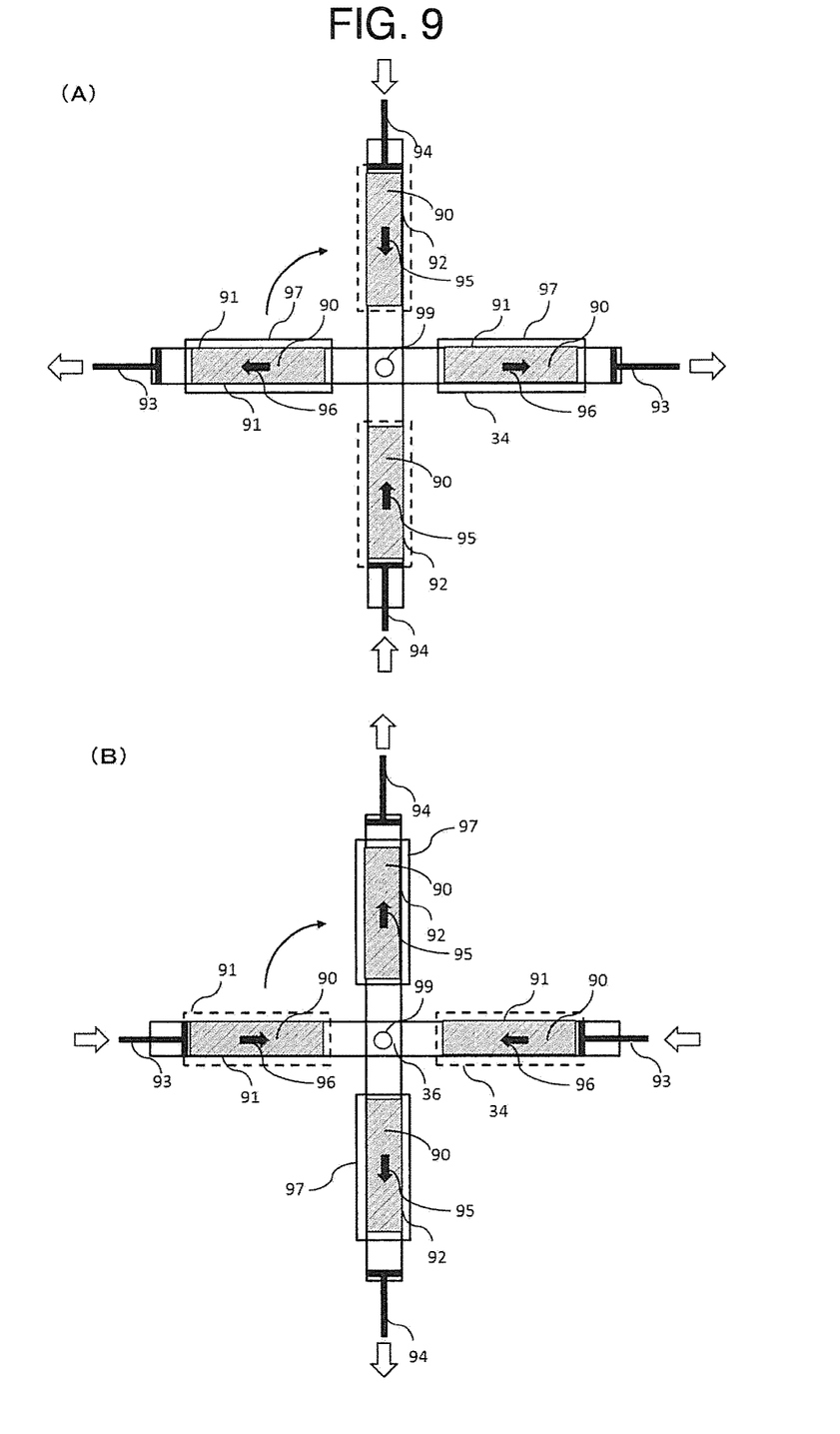
FIG. 9 shows the main structure of a device consisting of two horizontally opposed-type AMRs stacked according to a fifth embodiment of the invention, in which the refrigerant moves, in which FIG. 9, (A) shows a state where the permanent magnets are adjacent to one AMR bed and FIG. 9, (B) shows the permanent magnets are adjacent to the other AMR bed.

As shown in FIGS. 9, (A) and (B), for example, a magnetic refrigerating device of the invention includes: first and second cylindrical AMR beds 91 and 92 each containing refrigerants, the AMR beds 91 and 92 being joined at the center in the axis direction such that they intersect and the refrigerants are movable between the AMR beds 91 and 92 via the joint; two magnetic materials that are arranged in each of the AMR beds 91 and 92 in a direction of the axis so as to sandwich the joint, the magnetic materials being made of magnetocaloric effect materials; driving devices disposed at both ends of each of the AMR beds 91 and 92, the driving devices expanding and contracting for compression and suction while keeping the volumes of the refrigerants at fixed levels; low-temperature-side heat exchangers disposed at the joint; high-temperature-side heat exchangers disposed at both ends of the AMR beds 91 and 92; at least two permanent magnets facing the respective two magnetic materials in the AMR beds 91 and 92; a rotary shaft that is vertical to the AMR beds 91 and 92 provided at the joint; and a rotator that rotates the permanent magnets or the AMR beds 91 and 92 about the rotary shaft such that the permanent magnets and the magnetic materials repeatedly get close to and away from each other due to the rotation, wherein when the AMR bed 91 is close to the permanent magnets, the driving devices at both ends of the AMR bed 92 performs compression and the driving devices at both ends of the AMR bed 91 performs suction at the same time, and when the AMR bed 92 is close to the permanent magnets, the driving devices at both ends of the AMR bed 91 performs compression and the driving devices at both ends of the AMR bed 92 performs suction at the same time; through this operation, heat exchange occurs between the magnetic materials and the refrigerants when the refrigerants move in the AMR beds, thus generating a temperature difference between the joint of the AMR beds and each of both ends; and the low-temperature-side heat exchangers and the high-temperature-side heat exchangers respectively take absorbed heat and generated heat outside.

In a magnetic refrigerating device of the invention, it is preferable that the rotator includes two magnet-mounting plates positioned above and below the first or second AMR bed so as to face each other, the two magnet-mounting plates each including at least two permanent magnets facing the two magnetic materials.

In a magnetic refrigerating device of the invention, it is preferable that the driving devices at both ends of the first or second AMR bed each correspond to a piston in contact with the refrigerant and an actuator that expands and contracts the piston in the direction of the axis, or the resilience of a spring.

Advantageous Effects of Invention

A magnetic refrigerating device of the invention provides the following effects:
1) An AMR cycle consisting of two magnetic materials can be driven by one-time magnetic field control;
2) Each magnetic material is driven by a magnetic force and the resilience of the elastic material joining the magnetic materials, eliminating a need for an external mechanism for driving the magnetic materials;
3) The heat exchanging fluid is stopped in the AMR bed with respect to the magnetic materials and does not need to be driven by an external factor, thereby simplifying the structure; and
4) Rotating a component on which an AMR bed or permanent magnets are mounted easily increases the cycle rate.

DESCRIPTION OF EMBODIMENTS

Embodiments of the present invention will now be described in detail with reference to the drawings.

FIG. 4 is a structural cross-sectional view of a horizontally opposed-type two-cylinder AMR according to an embodiment of the present invention, in which FIG. 4, (A) shows an excited state and FIG. 4, (B) shows a demagnetized state. In the horizontally opposed-type two-cylinder AMR, the movements of magnetic materials $32a$ and $32b$, corresponding to the two cylinders, disposed respectively on the right and left sides are opposite on the same axis, and the magnetic materials cancel out the primary vibration and the secondary vibration each other. This also cancels out precession (couple vibration) due to a couple of force. The horizontally opposed-type two-cylinder AMR includes a combination of series-connected cylindrical magnetic materials which are disposed respectively on the right and left sides and 180° out of phase with each other. In other words, the horizontally opposed-type two-cylinder AMR has excellent vibration characteristics which balance the primary vibration, the secondary vibration, and the couple vibration like a series-connected two-cylinder AMR, which has a large total length, and is an ideal AMR which is compact, lightweight, and low vibration.

To be specific, in FIG. 4, the AMR bed 30 is filled with the magnetic materials $32a$ and $32b$, which are disposed respectively on the right and left sides, and refrigerants $31a$ and $31b$ and made of, for example, a nonmagnetic material. Examples of the nonmagnetic material include metals, such as aluminum, and resins, such as plastic. The refrigerants $31a$ and $31b$ transport heat generated by the magnetocaloric effect and are, for example, an antifreeze, such as water or an ethylene glycol solution. In the AMR bed 30, chambers containing the magnetic materials are defined by low-temperature-side heat exchangers $38a$ and $38b$ positioned between the magnetic materials $32a$ and $32b$ on the right and left sides.

The magnetic materials $32a$ and $32b$ are, for example, magnetic beds charged with magnetic particles providing the magnetocaloric effect, and the movements of the magnetic materials disposed respectively on the right and left sides are opposite on the same axis. The magnetic particles are of, for example, gadolinium (Gd). The magnetic materials $32a$ and $32b$ are movable in the AMR bed 30 and alternate between a state where they get closer to each other (FIG. 4, (A)) and a state where they get away from each other (FIG. 4, (B)). As shown in FIGS. 4, (A) and (B), the magnetic materials $32a$ and $32b$ move in the AMR bed 30 in the directions of the white arrows A and B, respectively. When close to permanent magnets $34a1$, $34a2$, $34b1$, and $34b2$, the magnetic materials $32a$ and $32b$ are adjacent to a rotary shaft 35. When away from the permanent magnets $34a1$, $34a2$, $34b1$, and $34b2$, the magnetic materials $32a$ and $32b$ are adjacent to end portions $40a$ and $40b$. The end portions of the magnetic materials $32a$ and $32b$ have a mesh partition plate that allows the magnetic particles to be held inside the bed and the refrigerants $31a$ and $31b$ and the magnetic particles to move relatively to each other. The magnetic beds corresponding to the magnetic materials $32a$ and $32b$ are made of, for example, a nonmagnetic material. Examples of the nonmagnetic material include metals, such as aluminum, and resins, such as plastic.

The permanent magnets $34a1$, $34a2$, $34b1$, and $34b2$, which are included in a magnetic field applying-removing mechanism, are disposed outside the AMR bed 30 and the permanent magnets $34a1$, $34a2$, $34b1$, and $34b2$ are provided in pairs for the respective magnetic materials 32a and 32b on the right and left sides so as to sandwich them, thereby forming a magnetic circuit. The permanent magnets 34a1 and 34b1 are disposed, for example, on a circular plate (not shown in the drawing) above the AMR bed 30. The permanent magnets 34a2 and 34b2 are disposed on a circular plate (not shown in the drawing) below the AMR bed 30. A rotation mechanism, not shown in the drawing, rotates the AMR bed 30 about the rotary shaft 35 and alternately generates the excited state and the demagnetized state. In this case, the positions of the two circular plates on which the permanent magnets 34a1, 34a2, 34b1, and 34b2 are placed are fixed. The rotary shaft 35 is coaxial with the AMR bed 30 and the pair of circular plates.

It should be noted that the rotation mechanism may rotate the pair of circular plates on which the permanent magnets 34a1, 34a2, 34b1, and 34b2 are placed while fixing the AMR bed 30 and may rotate the AMR bed 30 in the direction opposite to the direction in which the pair of circular plates is rotated. Moreover, the mechanism may move the permanent magnets 34a1, 34a2, 34b1, and 34b2 in the thickness direction of the AMR bed 30 and alternately generate the excited state and the demagnetized state. The movements of the permanent magnets 34a1, 34a2, 34b1, and 34b2 allow a magnetic field to be applied to or removed from the magnetic materials 32a and 32b. This also generates a magnetic torque, acting on the magnetic materials 32a and 32b, in the same direction as the direction of the movements of the permanent magnets 34a1, 34a2, 34b1, and 34b2 and the magnetic materials 32a and 32b.

A magnetic material reciprocating unit 36 is provided between the low-temperature-side heat exchangers 38a and 38b on the right and left sides. The drive force of the magnetic material reciprocating unit 36 and the magnetic torque given by the permanent magnets 34a1, 34a2, 34b1, and 34b2 cause the magnetic materials 32a and 32b to be opposed on the same axis and expand and contract in the axis direction. The magnetic material reciprocating unit 36 may be a driving device, such as an actuator, or an elastic material, such as a coil spring (spring coil). When the magnetic material reciprocating unit 36 is an elastic material, the resilience (elastic force) of the spring works as a drive force.

The low-temperature-side heat exchangers 38a and 38b and high-temperature-side heat exchangers 40a and 40b are made of, for example, Cu (copper), which has high thermal conductivity, and may be made of aluminum or a stainless steel fin or a stainless steel mesh instead. A magnetic refrigeration cycle propagates hot heat and cold heat generated in the refrigerants 31a and 31b to the low-temperature-side heat exchangers 38a and 38b and the high-temperature-side heat exchangers 40a and 40b, respectively. As described later, in a magnetic refrigerating device to which the magnetic refrigerating device according to this embodiment is applied, hot heat is transported from the low-temperature-side heat exchangers 38a and 38b to a hot heat outlet, and cold heat is transported from the high-temperature-side heat exchangers 40a and 40b to a cooling unit.

The behavior of a device having this structure will now be described.

Two magnetic materials 32a and 32b joined by the magnetic material reciprocating unit 36, such as a spring, are disposed in the AMR bed 30. The AMR bed 30 is charged with the heat exchange refrigerants 31a and 31b, such as water. Two magnetic materials (magnetocaloric materials) 32a and 32b are provided symmetrically. The end portions 38a and 38b of the magnetic materials 32a and 32b on the rotary shaft side are joined by an elastic material, such as a spring, serving as the magnetic material reciprocating unit 36.

The AMR bed 30 is rotated with respect to the fixed external magnets 34a1, 34a2, 34b1, and 34b2 so that magnetic fields are applied to and removed from the two magnetic materials 32a and 32b. When the magnetic materials are provided in appropriate positions with respect to the two magnetic materials 32a and 32b, the rotation of the AMR bed 30 generates a magnetic force that allows the two magnetic materials 32a and 32b to move in the magnetic bed 30 symmetrically. At this time, heat exchange with the heat exchanging fluids 31a and 31b in the AMR bed 30 occurs, thereby driving a cycle corresponding to the AMR refrigeration process which has been described with reference to FIG. 2. Therefore, in the horizontally opposed-type two-cylinder AMR having the structure shown in FIG. 4, low-temperature cold occurs in the portions 38a and 38b positioned in the center of the rotation, and high-temperature exhaust heat occurs in the end portions 40a and 40b.

Further details of heat transfer in the magnetic refrigerating device will now be described.

Upon application of magnetic fields by the magnets 34a1, 34a2, 34b1, and 34b2 positioned relatively close to the rotary shaft, the two magnetic materials 32a and 32b are attracted toward the rotary shafts 38a and 38b, respectively, by the magnetic force. At this time, the magnetic material for the magnetic materials 32a and 32b generates heat due to the magnetocaloric effect and exchange heat with the refrigerant due to the movement of the magnetic material, so that a relatively high-temperature refrigerant stagnates in the end portions 40a and 40b of the AMR bed 30.

When further rotation gets the AMR bed 30 out of the magnetic field, the resilience of the spring 36 causes the magnetic material in the two magnetic materials 32a and 32b to move to the end portions 40a and 40b while absorbing heat. In this process, the heat exchange with the refrigerant occurs, generating coldness in the central portions around the rotary shaft 35. When it is repeated, the temperatures in the central portions of the AMR bed 30 decrease, and the temperatures at the end portions increase. The heat exchangers 38a and 38b, which are disposed in the central portion, receive an external refrigerant from a different system, so that the coldness can be taken to the outside. The heat exchangers 40a and 40b at both ends are cooled by an external fan or other means, thereby exhausting heat.

An embodiment of the invention, which uses a horizontally opposed-type two-cylinder AMR, provides the following effects.

(i) One-time magnetic field control drives magnetic refrigeration cycles in two magnetocaloric effect materials. This generates the refrigerating effect twice as much as that in a conventional single-cylinder AMR.

(ii) Movement of the refrigerants is unnecessary, so that a need of an external pump for driving the refrigerants is eliminated unlike a conventional single-cylinder AMR, thereby dramatically simplifying the device. This reduces a heat loss and increases the rate of the refrigeration cycles.

(iii) Two or more AMR beds are disposed in appropriate positions with respect to the magnets, so that the magnetic torque entering the magnets and the magnetic torque from the magnets cancel out each other, which largely contributes to a reduction in drive force. This means that the refrigerating efficiency is increased.

Figure 5:
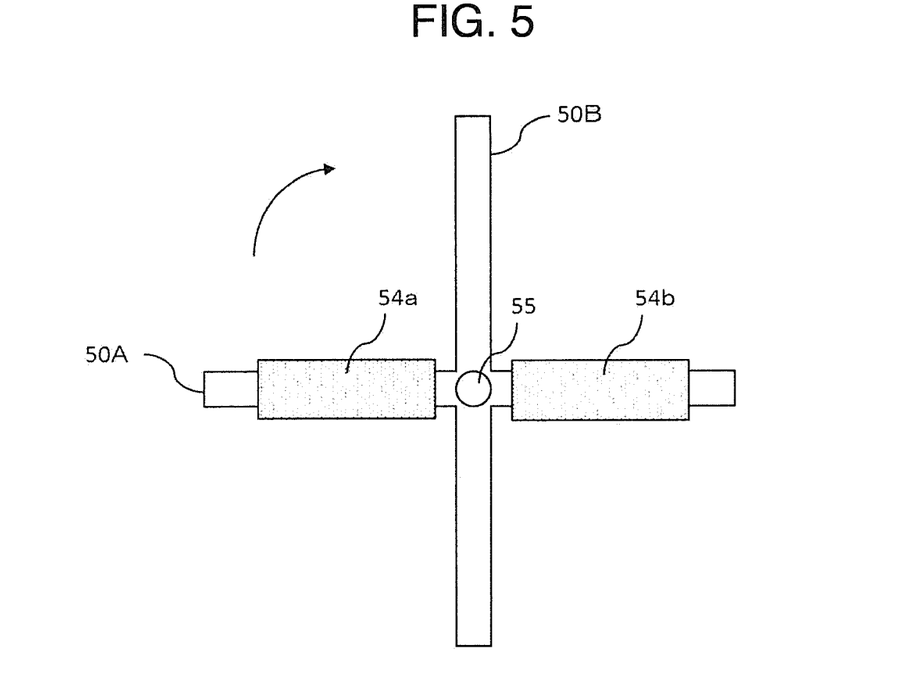
FIG. 5 shows the main structure of a device consisting of two horizontally opposed-type AMRs combined according to a second embodiment of the invention.

FIG. 5 is a structural diagram of a second embodiment of the invention, showing the main structure of a device in which two horizontally opposed-type AMRs are combined. FIG. 5 shows a magnetic refrigerating device in which the horizontally opposed-type two-cylinder AMRs, which are the same as in FIG. 1 but out of phase, are combined.

In FIG. 5, AMR beds 50A and 50B each have two magnetic materials joined by a magnetic material reciprocating unit, such as a spring, and its inner structure is similar to FIG. 1 and thus is omitted in the drawing. The AMR bed 50A, which is depicted in a horizontal state in FIG. 5, is in a position overlapping permanent magnets 54*a* and 54*b*. The AMR bed 50B, which is disposed in a position intersecting the AMR bed 50A, is away from the permanent magnets 54*a* and 54*b*. The rotary shaft 55 is provided along the rotation axis of a pair of circular plates (not shown in the drawing) on which the AMR beds 50A and 50B and the magnets 54*a* and 54*b* are mounted.

Since a magnetic refrigerating device with this structure includes two horizontally opposed-type AMRs combined, the AMR beds 50A and 50B pass by the fixed magnets 54*a* and 54*b* when rotating in the direction of the arrow. When they pass by these, the AMR beds 50A and 50B cancel out the magnetic forces each other.

Figure 6:
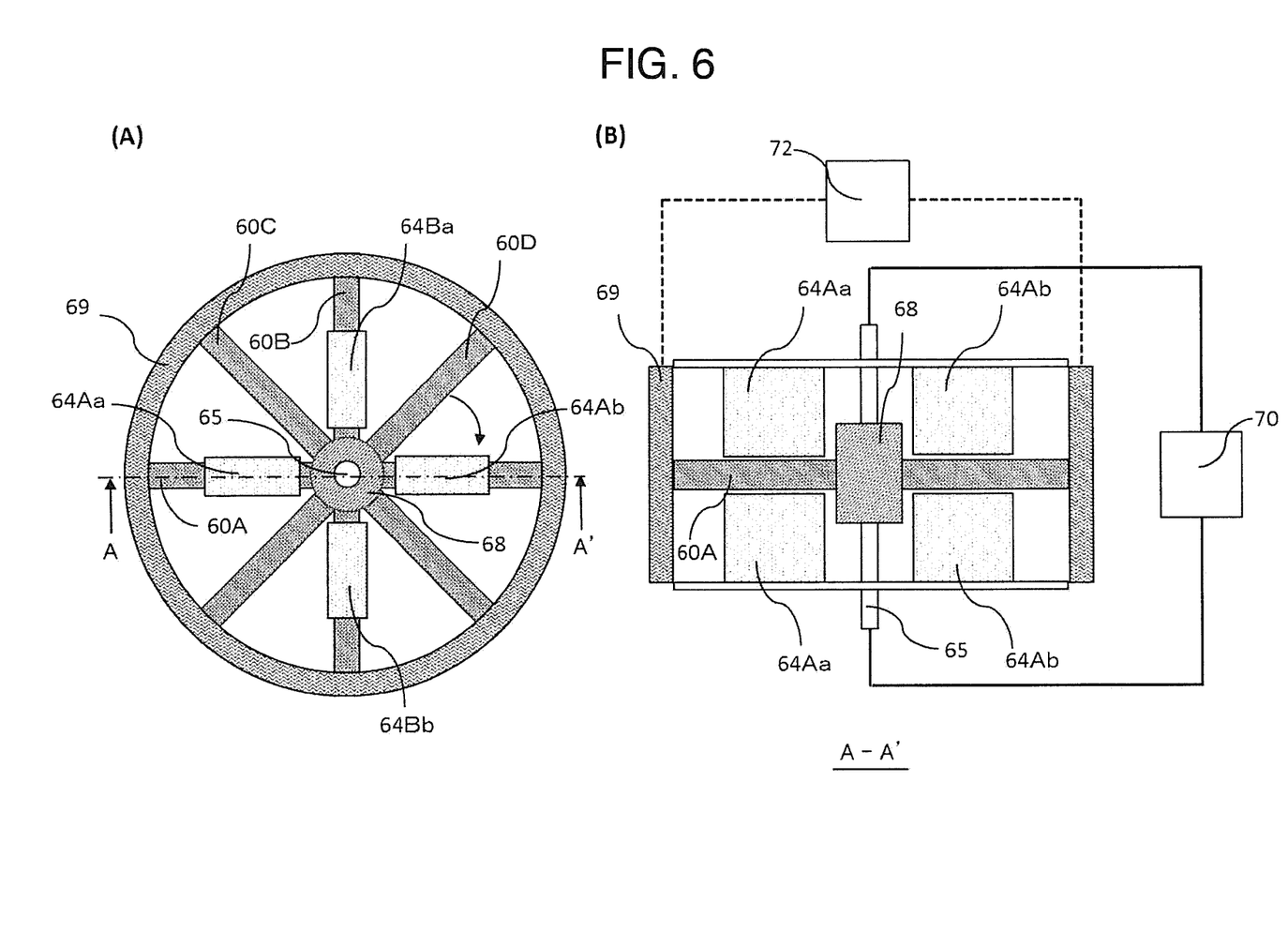
FIG. 6 shows the main structure of a device consisting of four horizontally opposed-type AMRs combined according to a third embodiment of the invention, in which AMR beds rotate.

FIG. 6 is a structural diagram of the third embodiment of the invention, showing the main structure in which four horizontally opposed-type AMRs are combined. FIG. 6, (A) is a plan view, and FIG. 6, (B) is a cross-sectional view along line A-A in FIG. 6, (A). Here, four horizontally opposed-type AMRs are combined and cold heat is further transported from low-temperature-side heat exchangers for the AMRs to coolers 68 and 70. In addition, hot heat is further transported from high-temperature-side heat exchangers for the AMRs to heat outlets 69 and 72. Rotary shaft central portions 65 and 68 of the AMRs are common components for convenience of heat exchange and drive. When viewed from the rotary shaft central portions of the AMRs, eight single-cylinder AMRs look like hub and spokes. Note that the arrow indicates the direction of the rotation of the AMR bed.

In FIG. 6, AMR beds 60A, 60B, 60C, and 60D each includes two magnetic materials joined by a magnetic material reciprocating unit, such as a spring, and their inner structures are similar to FIG. 4 and thus are omitted in the drawing. The AMR bed 60A, which is depicted in a horizontal state in FIG. 6, is in a position overlapping permanent magnets 64Aa and 64Ab. The AMR bed 60B, which is disposed in a position intersecting the AMR bed 60A, is in a position overlapping permanent magnets 64Ba and 64Bb. The AMR beds 60C and 60D, which are disposed at 45° to the AMR beds 60A and 60B, are away from the permanent magnets 64Aa, 64Ab, 64Ba, and 64Bb. A rotary shaft 65 is provided along the rotation axis of a pair of circular plates (not shown in the drawing) on which the AMR beds 60A, 60B, 60C, and 60D and the magnets 64Aa, 64Ab, 64Ba, and 64Bb are mounted. The pair of circular plates each faces the tops or bottoms of the AMR beds 60A, 60B, 60C, and 60D.

A low-temperature-side heat exchanger 68 is mounted to the rotary shaft 65 at its center and one ends of the eight single-cylinder AMRs are mounted to the outer periphery of the exchanger. The high-temperature-side heat exchanger 69 has a ring shape having an inner periphery to which the other ends of the eight single-cylinder AMRs are mounted. A cooling-side heat exchanger 70 is used to perform cooling by introducing a refrigerant to the low-temperature-side heat exchanger 68. A heat-exhausting-side heat exchanger 72 is used to conduct exhaust heat by introducing a refrigerant to the high-temperature-side heat exchanger 69.

Since a magnetic refrigerating device with this structure includes four horizontally opposed-type AMRs combined, the AMR beds 60A, 60B, 60C, and 60D pass by the fixed permanent magnet 64Aa, 64Ab, 64Ba, and 64Bb when rotating in the direction of the arrow. When they pass by these, the AMR beds 60A, 60B, 60C, and 60D cancel out the magnetic forces each other.

Figure 7:
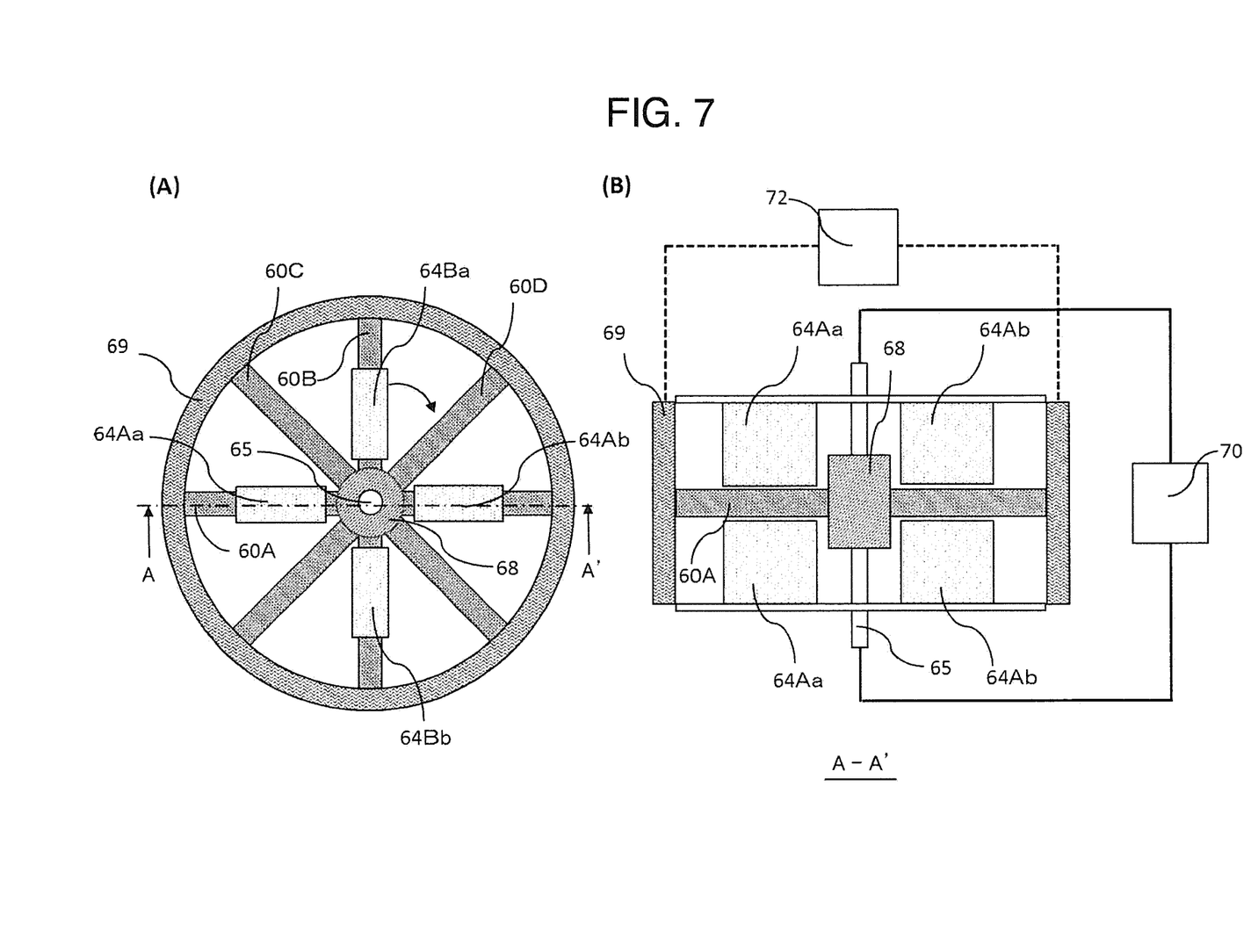
FIG. 7 shows the main structure of a device consisting of four horizontally opposed-type AMRs combined according to a modification of the third embodiment of the invention, in which permanent magnets rotate.

FIG. 7 is a structural diagram of a modification of a third embodiment of the invention, showing the main structure in which four horizontally opposed-type AMRs are combined. In FIG. 7, the arrow indicates the direction of the rotation of the permanent magnets, and the AMR beds are fixed. In other words, the fixation and rotation relationship between the AMR beds and the permanent magnets is opposite to that in the third embodiment shown in FIG. 6. Here, in both of the embodiments in FIGS. 6 and 7 in which the magnetic materials can reciprocate, rotating the magnets and rotating the AMR beds are different merely in relative movements and result in the same refrigeration cycles to be conducted. These, however, require different structures of the magnetic refrigerating device: one is a type in which the rotary shaft is in cooperation with the magnets (or a structure including the permanent magnets), and the other is a type in which the rotary shaft is in cooperation with the AMR beds.

According to the third embodiment of the invention in FIGS. 6 and 7, a magnetic refrigeration device consisting of four AMR beds can cancel out the magnetic force when passing by the fixed magnets and has two or more AMR beds disposed symmetrically, thereby reducing the drive force.

Figure 8:
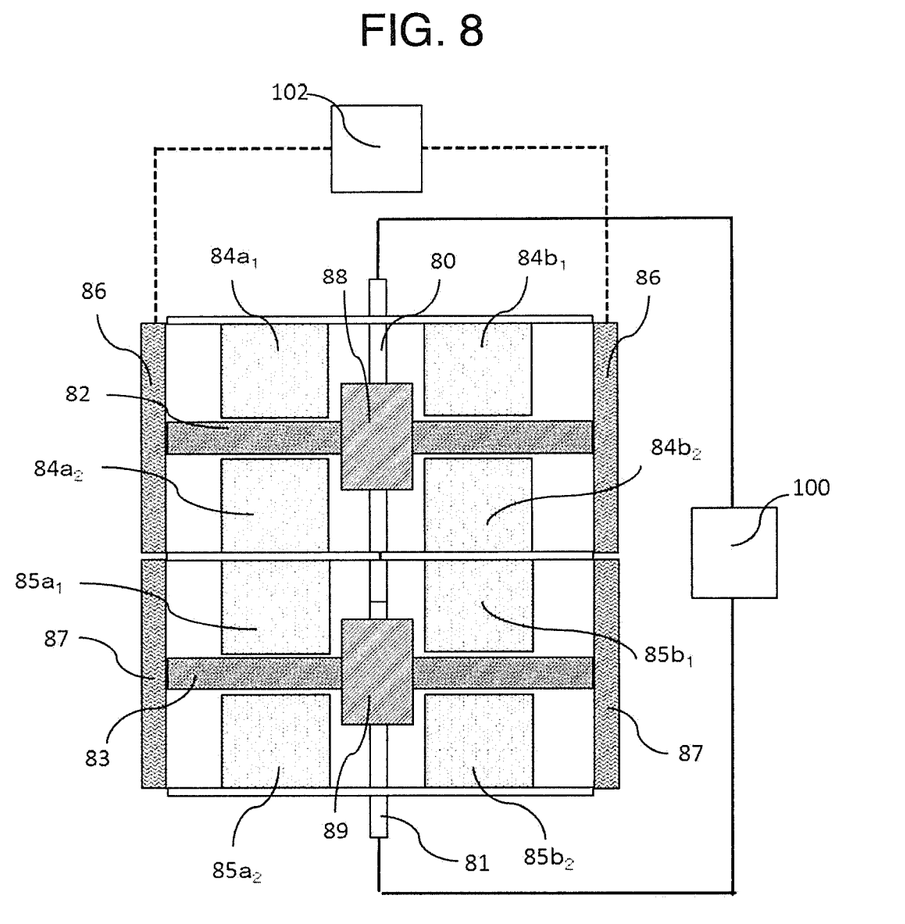
FIG. 8 shows the main structure of a device consisting of two horizontally opposed-type AMRs stacked according to a fourth embodiment of the invention.

FIG. 8 is a structural diagram of a fourth embodiment of the invention, showing the main structure of a device in which two horizontally opposed-type AMRs are stacked. In FIG. 8, AMR beds 82 and 83 each include two magnetic materials joined by a magnetic material reciprocating unit, such as a spring, and their inner structures are similar to FIG. 4 and thus are omitted in the drawing. Low-temperature-side heat exchangers 88 and 89 are provided in the central portions, and high-temperature-side heat exchangers 86 and 87 are provided at both ends.

The AMR bed 82, which is depicted upward in FIG. 8, is in a position overlapping permanent magnet 84*a*1, 84*a*2, 84*b*1, and 84*b*2. The AMR bed 83, which is disposed lower than the AMR bed 82, are away from the permanent magnets 85*a*1, 85*a*2, 85*b*1, and 85*b*2. Rotary shafts 80 and 81 are provided along the rotation axis of a pair of circular plates (not shown in the drawing) on which the AMR beds 82 and 83 or the permanent magnets 84*a*1, 84*a*2, 84*b*1, 84*b*2, 85*a*1, 85*a*2, 85*b*1, and 85*b*2 are mounted. The rotary shaft 80 and the rotary shaft 81, which have the same rotation axis, are joined.

A low-temperature-side heat exchanger 88 is mounted to the rotary shaft 80 at its center and its outer periphery is mounted to the central portion of the AMR bed 82. A high-temperature-side heat exchanger 86 has, for example, a ring shape having an inner periphery to which both ends of the AMR bed 82 are mounted. A low-temperature-side heat exchanger 89 is mounted to the rotary shaft 81 at its center and its outer periphery is mounted to the central portion of the AMR bed 83. A high-temperature-side heat exchanger 87 has, for example, a ring shape having an inner periphery to which both ends of the AMR bed 83 are mounted. A cooling-side heat exchanger 100 is used to perform cooling by introducing a refrigerant to the low-temperature-side heat exchangers 88 and 89. A heat-exhausting-side heat exchanger 102 is used to conduct exhaust heat by introducing a refrigerant to the high-temperature-side heat exchangers 86 and 87.

Since a magnetic refrigerating device with this structure includes two horizontally opposed-type AMRs stacked, the AMR beds 82 and 83 pass by the fixed permanent magnets 84a1 to 85b2 when rotating. Alternatively, the permanent magnets 84a1 to 85b2 pass by the fixed AMR beds 82 and 83 when rotating. When they pass by these, heat exchange occurs. The fourth embodiment, in which two horizontally opposed-type AMRs are stacked, easily increases the refrigerating capacity.

FIGS. 9, (A) and (B) are structural diagrams showing a fifth embodiment of the invention. Two beds 91 and 92 filled with magnetic materials 90 and a heat exchanging fluid are joined in the middle, the heat exchanging fluid is movable between two beds. Here, each magnetic material 90 is fixed to the corresponding bed, and pistons 93 and 94 at both ends of the beds 91 and 92 make the heat exchanging fluid movable in the bed and the magnetic material 90. The pistons 93 and 94 are driven at opposite phases. When the ends of the pistons 94 at both ends of the bed 92 are pushed, the pistons 93 at both ends of the bed 91 concurrently move toward the outside, thereby keeping the volume of the heat exchanging fluid inside at a fixed level. The pistons are driven by use of the resilience of a spring or a driving device, such as an actuator.

In this embodiment, the beds 91 and 92 are stopped, and magnets 97 are rotated. FIG. 9, (A) indicates a situation where the magnets 97 overlap the magnetic materials 90 in the bed 91. The magnets 97 magnetize the magnetic materials 90 in the bed 91, cause the pistons 94 in the bed 92 to move toward the center, and cause the pistons 93 in the bed 91 to move toward the outside at the same time. This makes the heat exchanging fluid flow in the bed 92 in the directions of arrows 95 and move toward both ends of the bed 91 through the joint in the directions of arrows 96. At this time, coldness generates at the joint and heat generated in the magnetic materials in the bed 91 moves toward both ends of the bed 91.

FIG. 9, (B) shows a situation after the magnets 97 rotated about a drive shaft 99 have moved from the bed 91 to the bed 92. The pistons are driven at the phrase opposite to that in the situation shown in FIG. 9, (A), so that coldness accumulates at the joint in the middle and generated heat accumulates at both ends of the beds 91 and 92 in the same manner. Low-temperature-side heat exchangers are provided at the joint in the middle and high-temperature-side heat exchangers are provided at both ends, allowing absorbed heat and generated heat to be taken outside. This system is characterized in that the magnetic materials are fixed to the beds, the volume of the heat exchanging fluid is kept at a fixed level, the pistons installed in the two beds are driven at the opposite phases, and this driving operation is in sync with the rotation of the magnets. This provides the same results as and similar AMR effects to those of the system for driving the magnetic materials in the previous embodiment.

It should be noted that the invention should not be limited to the above embodiments, which illustrate magnetic refrigerating devices including various horizontally opposed-type AMRs, and various design modifications can be made without departing from the scope obvious to those skilled in the art and should be interpretatively included in the scope of the invention.

INDUSTRIAL APPLICABILITY

The magnetic refrigerating device of the invention is suitable for use in refrigerating and cooling devices within the range from room temperature to cryogenic temperature. In particular, the magnetic refrigerating device of the invention is suitable for use in air conditioners, refrigerators, freezers, and cryogenic refrigerators, for example.

REFERENCE SIGNS LIST 10, 20, 30: AMR bed
11, 21, 31a, 31b: Refrigerant
12, 22, 32a, 32b: Magnetic material
14a, 14b, 14c: Piston
24, 34a1, 34a2, 34b1, 34b2, 54, 64, 84a1, 84a2, 84b1, 84b2, 94a1, 85a2, 85b1, 85b2: Magnets
35, 55, 65, 80, 81, 99: Rotary shaft
36: Magnetic material reciprocating unit
50A, 50B, 60A, 60B, 60C, 60D, 82, 83: AMR bed
38a, 38b, 68, 88, 89: Low-temperature-side heat exchanger
40a, 40b, 69, 86, 87: High-temperature-side heat exchanger
70, 100: Cooling-side heat exchanger
72, 102: Heat-exhausting-side heat exchanger

The invention claimed is:

1. A magnetic refrigerating device comprising:
    a horizontally opposed, two cylinder AMR bed that contains a refrigerant, wherein a cylindrical axis of each of the two cylinders of the AMR bed are arranged along a common longitudinal axis;
    two magnetic materials arranged in a direction of the common longitudinal axis of the AMR bed, the magnetic materials being series-connected and movable in the direction of the common longitudinal axis and made of magnetocaloric effect materials;
    at least two permanent magnets each facing each of the two magnetic materials in the AMR bed;
    a rotary shaft between the two magnetic materials in the AMR bed and between the at least two permanent magnets;
    two magnet-mounting plates arranged above and below the AMR bed so as to face each other, the at least two permanent magnets being arranged on each of the two magnet-mounting plates and respectively facing the two magnetic materials, and
    a rotator that rotates the two magnet-mounting plates including the permanent magnets or the AMR bed about the rotary shaft,
    wherein the permanent magnets and the two magnetic materials repeatedly move toward and away from each other due to the rotation, and
    wherein heat exchange occurs between the magnetic materials and the refrigerant in the AMR bed and generates a temperature difference in the AMR bed.

2. The magnetic refrigerating device according to claim 1, further comprising a magnetic material reciprocating unit that causes the two magnetic materials to reciprocate in the direction of the common longitudinal axis such that when one of the magnetic materials moves toward an outside in the direction of the common longitudinal axis of the AMR bed, the other magnetic material also moves toward the outside.

3. The magnetic refrigerating device according to claim 1, further comprising:
    high-temperature-side heat exchangers at both a first outer end and a second outer end of the horizontally opposed, two cylinder AMR bed; and
    low-temperature-side heat exchangers adjacent to the rotary shaft of the AMR bed.

4. The magnetic refrigerating device according to claim 3, wherein a plurality of the horizontally opposed, two cylinder AMR beds are arranged in a same layer, each AMR bed having the rotary shaft at its center, the two magnet-mounting plates are arranged above and below the layer in which the plurality of AMR beds are arranged, and each of the two magnet-mounting plates includes the at least two permanent magnets each facing the horizontally opposed, two cylinder AMR beds, and the number of the permanent magnets is two or more and is less than the doubled number of the arranged AMR beds.

5. A magnetic refrigerating device comprising:

a horizontally opposed, two cylinder AMR bed that contains a refrigerant, wherein a cylindrical axis of each of the two cylinders of the AMR bed are arranged along a common longitudinal axis;

two magnetic materials arranged in a direction of the common longitudinal axis of the AMR bed, the magnetic materials being movable in the direction of the common longitudinal axis of the AMR bed and made of magnetocaloric effect materials;

a magnetic material reciprocating unit that causes the two magnetic materials to reciprocate in the direction of the common longitudinal axis such that when one of the magnetic materials moves toward an outside in the direction of the common longitudinal axis of the AMR bed, the other magnetic material also moves toward the outside; and a magnetic field applying-removing mechanism that applies and removes a magnetic field to generate a magnetic force and drives the magnetic materials by the generated magnetic force, wherein heat exchange occurs between the magnetic materials and the refrigerant in the AMR bed and generates a temperature difference in the AMR bed.

6. The magnetic refrigerating device according to claim 5, wherein the magnetic field applying-removing mechanism includes at least two permanent magnets respectively facing the two magnetic materials in the AMR bed.

7. The magnetic refrigerating device according to claim 5, wherein the magnetic material reciprocating unit is an elastic material that is provided between the two magnetic materials.

8. The magnetic refrigerating device according to claim 5, wherein the magnetic material reciprocating unit is an actuator that is provided between the two magnetic materials and expands and contracts in the direction of the common longitudinal axis.

9. A magnetic refrigerating device comprising:

first and second horizontally opposed, two cylinder AMR beds each containing refrigerant, wherein cylinders in each of the AMR beds are series-connected and a cylindrical axis of each of the cylinders in each of the AMR beds are arranged along a common longitudinal axis, and wherein the first and second AMR beds are arranged in a same plane and joined to each other at a center of the common longitudinal axis of the respective AMR bed such that the common longitudinal axis of each of the first and second AMR beds intersect and the refrigerant is movable between the first and second AMR beds via a joint at the center;

two magnetic materials that are arranged in each of the first and second AMR beds in the direction of the common longitudinal axis, the two magnetic materials sandwiching the joint, and the magnetic materials being made of magnetocaloric effect materials;

driving devices disposed at both a first outer end and a second outer end of each of the first and second AMR beds, the driving devices expanding and contracting for compression and suction of the refrigerant while keeping the total volume of the refrigerant in the first and second AMR beds at a fixed level;

low-temperature-side heat exchangers disposed at the joint;

high-temperature-side heat exchangers disposed at both outer ends of each of the first and second AMR beds;

at least two permanent magnets each facing each of the two magnetic materials in the first or second AMR bed;

a rotary shaft that is vertical to the first and second AMR beds provided at the joint; and a rotator that rotates the permanent magnets or the first and second AMR beds about the rotary shaft such that the permanent magnets and the magnetic materials repeatedly move toward and away from each other due to the rotation, wherein when the first AMR bed is sufficiently close to be effected by a magnetic field of the permanent magnets, the driving devices at both outer ends of the second AMR bed perform compression of the refrigerant and the driving devices at both outer ends of the first AMR bed perform suction of the refrigerant, the compression and the suction being performed at the same time, and wherein when the second AMR bed is sufficiently close to be effected by a magnetic field of the permanent magnets, the driving devices at both outer ends of the first AMR bed perform compression of the refrigerant and the driving devices at both outer ends of the second AMR bed perform suction of the refrigerant, the compression and the suction being performed at the same time;

whereby, through this operation, heat exchange occurs between the magnetic materials and the refrigerant when the refrigerant moves in the first and second AMR beds, thus generating a temperature difference between the joint of the first and second AMR beds and each of the both outer ends; and the low-temperature-side heat exchangers and the high-temperature-side heat exchangers respectively take absorbed heat and generated heat outside.

10. The magnetic refrigerating device according to claim 9, wherein the rotator includes two magnet-mounting plates positioned above and below the first or second AMR bed so as to face each other, the two magnet-mounting plates each including at least two permanent magnets facing the two magnetic materials.

11. The magnetic refrigerating device according to claim 9, wherein the driving devices at both outer ends of the first or second AMR bed each comprise a piston in contact with the refrigerant and an actuator that expands and contracts the piston in the direction of the common longitudinal axis or a resilience of a spring.

12. The magnetic refrigerating device according to claim 2, further comprising:

high-temperature-side heat exchangers at both a first outer end and a second outer end of the horizontally opposed, two cylinder AMR bed; and low-temperature-side heat exchangers adjacent to the rotary shaft of the AMR bed.

* * * * *